Figure 1:
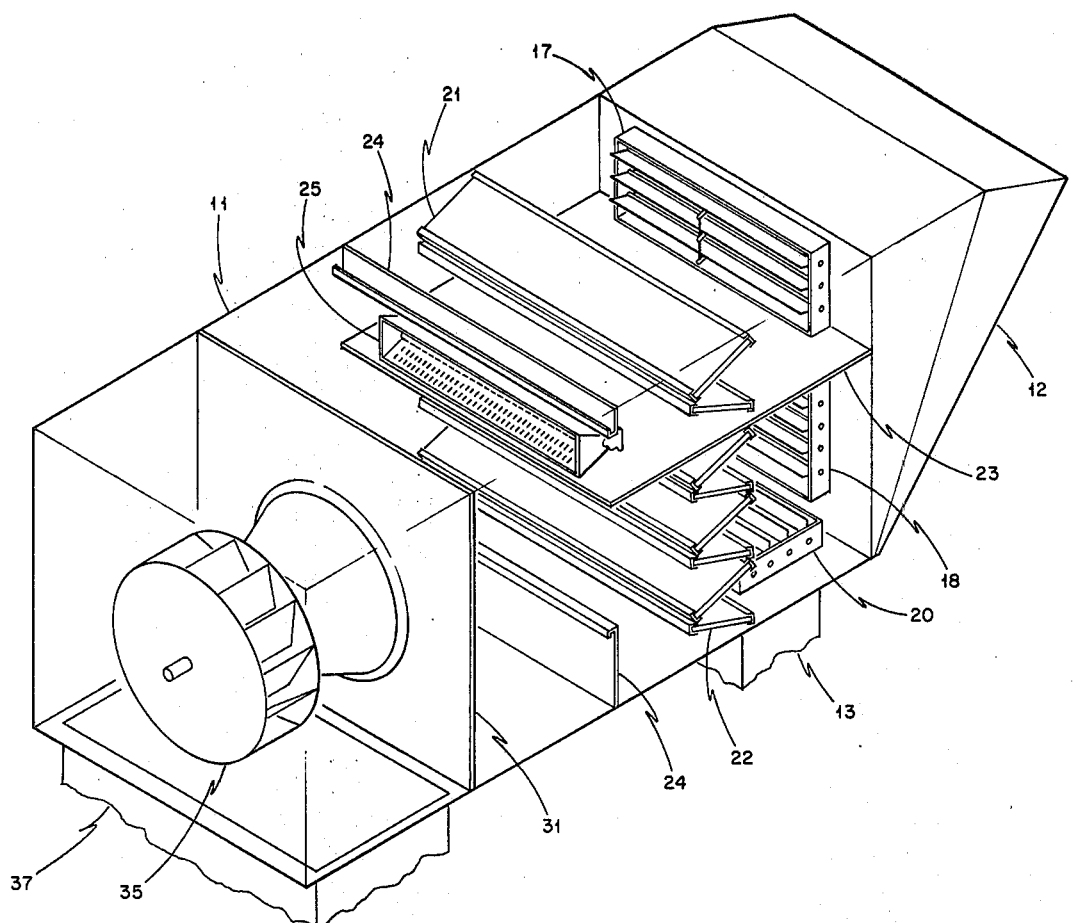

United States Patent [19]
Dirkes

[11] 4,429,679
[45] Feb. 7, 1984

[54] MODULAIR AIR HEATER

[75] Inventor: James V. Dirkes, Grand Rapids, Mich.

[73] Assignee: Rapid Engineering, Inc., Grand Rapids, Mich.

[21] Appl. No.: 306,941

[22] Filed: Sep. 30, 1981

[51] Int. Cl.³ .............................................. F24H 3/02
[52] U.S. Cl. ............................. 126/110 A; 126/110 C; 126/116 R; 237/46; 432/55; 165/16
[58] Field of Search ...................... 432/47, 55; 236/13; 237/46; 126/110 C, 110 R, 110 A, 116 R, 165 R; 98/33 A; 165/16

[56] References Cited

U.S. PATENT DOCUMENTS

| | | | |
|---|---|---|---|
| 3,246,643 | 4/1966 | Stark et al. | 98/33 A |
| 3,398,940 | 8/1968 | Kosarin | 432/55 X |
| 4,325,352 | 4/1982 | Dirkes | 126/110 C |

Primary Examiner—Albert J. Makay
Assistant Examiner—Henry Bennett
Attorney, Agent, or Firm—Wilfred O. Schmidt

[57] ABSTRACT

An improvement of the space heating system delivering a composite comprising of heated outdoor air, unheated outdoor air and recirculated indoor air into a building to counter a natural infiltration of outdoor air by modulating the composite air supply delivered to the interior of a building.

11 Claims, 2 Drawing Figures

U.S. Patent  Feb. 7, 1984  4,429,679

MODULAIR AIR HEATER

The present invention relates to an improvement in a space heating system which responds to counter natural infiltration of outdoor air, and more particularly, is related to an improvement in the said system which responds to counter the natural infiltration of outdoor air by modulating the composite air supply delivered to the interior of a building.

The U.S. Pat. No. 3,186,697, issued to Haedlike et al, discloses a space heating system consisting of a burner within a profile opening with a thermostat fuel control, an outdoor air intake upstream of the said burner and a fan wheel downstream of the burner to pull outdoor air across the burner and deliver the resultant heated air into the building. The fan wheel being of sufficient capacity and rating to pull the outdoor air across the burner at a profile velocity to support complete combustion.

The U.S. Pat. No. 3,398,940, issued to B. A. Kosarin, discloses an improvement of the space heating system wherein a composite of heated outdoor air and recirculated indoor air is delivered into the building by the fan wheel. The outdoor air pulled across the burner can be reduced down to 50% of volume with a proportionate increase in the recirculated indoor air pulled into the system to bypass the burner. The respective volumes are controlled by synchronized dampers. As the profile velocity of the air across the burner varies directly with the volume of outdoor air pulled through the system special controls are needed to assure complete combustion.

The U.S. Pat. No. 3,591,150, issued to R. Weatherston, discloses another improvement of the space heating system wherein a composite of heated outdoor air and unheated outdoor air are delivered into the building by the fan wheel. The outdoor air to be heated passes over the burner whereas profile dampers regulate the unheated outdoor air flowing into the system to maintain the profile velocity across the burner to support complete combustion. A discharge damper situated downstream of the fan wheel controls the volume of the composite air delivered into the building.

The improvement of the space heating system disclosed herein is that the fan wheel delivers a composite comprising of heated outdoor air, unheated outdoor air and recirculated indoor air into the building. The outdoor air pulled across the burner to be heated has a fixed volume which equated with the constant speed drive of the fan wheel results in a profile velocity able to sustain complete fuel combustion. The unheated outdoor air and the recirculated indoor air bypass the burner and are variable in complementary volume relationship with one another. That is, as the unheated outdoor air is increased in volume from zero to a maximum equal to a multiple of the volume of heated air, the recirculated indoor air decreases in volume from a maximum equal to the said multiple of the volume of heated air to zero.

It is known by those skilled in the space heating art that in order for heated air to flow into a building there must be a displacement of an equal volume of air out of the building. Also, that a continuously forced circulation of heated air, having a small temperature differential with the interior temperature (approximately 15° F.) is essential for uniform heating. Further, that for maximum comfort and health conditions the indoor building air must be exchanged with outdoor air at the rate of one and one-half (1½) or more changes per hour.

The continuously forced circulation of heated air balances the air inflow with the air flow at a residual positive pressure (+0.1 inches water column). As the consequence of keeping the heated air inflow at a small temperature differential with the interior air temperature, the heated air moves down to the lower occupied levels and continuously pushes carbon dioxide, odors and smoke out of the and eliminates cold air infiltrated drafts.

The centrifugal fans that may be used in space heating systems are known as backward curved, forward curved and material handling. These fans would all mix the composite air supply to some extent, however, the use of a backward curved fan is preferred. That form of wheel will mix the composite air and deliver an air supply of relatively uniform temperature and density into the building.

In case of mild outdoor temperatures the heated air supply will require a small, if any, temperature rise to maintain the 70° F. building temperature, whereas in severe winter conditions the temperature rise of 120° F. or more may be needed to maintain that temperature.

The burner contemplated for use in this invention is described and illustrated in the U.S. Pat. Nos. 3,051,464; 3,178,161 and 3,297,259.

It is the characteristic of this burner that when operating with natural or propane gas as fuel and with the profile velocity of outdoor air over the burner in the range of 2800 to 3250 feet per minute (fpm), a temperature rise of 126° F. can be accomplished without the combustion contaminants in the heated airstream even closely approaching the statutory limits established for public safety. The burner has a maximum reference temperature rise of 1000° F. at a heat input of one-half (½) million ($10^6$) BTU.

It has been determined that to support complete combustion the volume of outdoor air drawn across the burner and heated to a pre-selected temperature, must bear a minimun percentage by volume relationship to the volume of the total composite air supply delivered into the building. This percentage by volume is a function of the desired temperature rise ($\Delta t$) divided by the reference maximum temperature rise ($\Delta T$) for the respective burner. Consequently, to attain the 126° temperature rise the percentage by volume of outside air pulled across the burner is a minimum of 12.6% (($126/1000) \times 100 = 12.6\%$).

It is the policy for applications in temperature climatic conditions to fix the volume of outdoor air drawn across the burner and heated to a pre-selected temperature to bear a twenty percent by volume relationship to the volume of the total composite air supply delivered into the building.

As the consequence of fixing the volume of outdoor air pulled across the burner at twenty percent, the volume of modulating unheated outdoor air will range from zero to eighty percent as demanded by the preselected temperature, ventilation and pressure. As aforementioned, the recirculated indoor building air will vary in a complementary fashion thus giving the space heating system of this invention an outdoor/indoor ratio of 5 to 1.

It is the purpose of the pressurized space heating to control natural infiltration of outside air and superimpose relative uniform heating conditions within the building.

The natural infiltration is the flow of outdoor air through cracks and apertures around windows and doors and through floors and walls into the building. The outdoor environmental elements giving rise to a negative pressure within the building to induce the inward air flow are the wind and the difference in density between indoor and outdoor air.

The effect of the wind impacting the windward side of a building gives rise to a first positive pressure pushing outdoor air into the building through openings in the windward wall. The same wind impact induces on the leeward side a negative pressure to pull air from the indoor of a building through the openings in the leeward wall. The pulling of indoor air, exfiltration, in turn gives rise to a second negative pressure within the building. The second negative pressure aids to pull outdoor air into the building.

A density difference between indoor and outdoor air (the inside air temperature is higher, thus less dense) results in the exfiltration of indoor air by the chimney or stack effect. The higher temperature air rises within the building leaving a negative pressure at the lower level and creating a positive pressure at the upper level. The negative pressure pulls outdoor air through the openings at the lower level, causing outdoor air to infiltrate, and pushes indoor air through openings in the upper level (chimneys and stacks) causing indoor air to exfiltrate.

The resistance offered to the air flow by the openings in the building relates directly to the length of time required for the indoor air pressure to become stabilized. That is, the length of time necessary for the continuous delivery of pressurized air to establish uniform heating and comfort conditions in the immediate vicinity effected by the openings. However, at the extremes, that is, at negligible resistance (open windows or doors) or at infinite resistance (air tight interiors), neither uniform heating or comfort conditions can be established. In the first instance, negligible resistance, the negative pressure created by the unrestricted infiltration and exfiltration of outdoor air cannot be controlled, and in the second, infinite resistance, an absolute blockage against all air flow results.

In addition to enfironmentally induced negative pressures, mechanical heating and ventilating equipment can also generate negative pressure to alter infiltration and exfiltration characteristics of the building.

The space heating system of this invention, by reason of the aforementioned 1 to 5 outdoor/indoor ratio, automatically balances the delivery of air into the building with the natural infiltration and exfiltration characteristics (resistance to air flow) of the building to which it is applied.

The preferred backward curved fan mixes and continuously delivers a fixed volume air supply into the building. A 20% part of that volume is heated air, the temperature regulated by thermostat strategically placed within the building. An 80% part of that volume, comprising volumes of unheated outdoor air and recirculated indoor air in complementary relationship with each other.

The volume of unheated outdoor air increases or decreases on demand to keep the heat content of the air supply at small temperature differentials with the indoor air in order that the air supply will penetrate to the lower levels and increases the density of the air supply to control within negative pressures.

The recirculated indoor air decreases and increases in complementary relationship with the volume of unheated outdoor air. The recirculation of indoor air does not require exfiltration and acts to keep a constant load on the fan and to keep the air within the building in continuous circulation.

It is the object of this invention to provide a pressurized space heating apparatus wherein a fixed portion of the incoming outside air is drawn over the burner at a given profile velocity to be heated, and the other portion mixed in complementary proportions with recirculated building air, the said two portions combining downstream of the said burner to maintain throughout the building interior air at a substantial uniform temperature and a pre-selected pressure.

It is another object of the invention to provide a pressurized space heating apparatus to alter on demand the complementary proportions of unheated outside air and recirculated building air to generate a pressure differential to counter the build up of negative pressures within the space to be heated.

It is a further object of this invention to provide a pressurized space heating apparatus to continuously alter the complementary proportions of unheated outside air to recirculated building air to modulate the fixed volume of heated air to maintain a small temperature differential with the temperature of the air in the space heated.

Other objects and features of the invention will be appreciated and become apparent to those skilled in the art upon consideration of the accompanying drawings and the following detailed description wherein an exemplary embodiment, of the invention is disclosed.

In the drawings:

FIG. 1. An isometric presentation of an air heater apparatus incorporating the invention.

Figure 2:
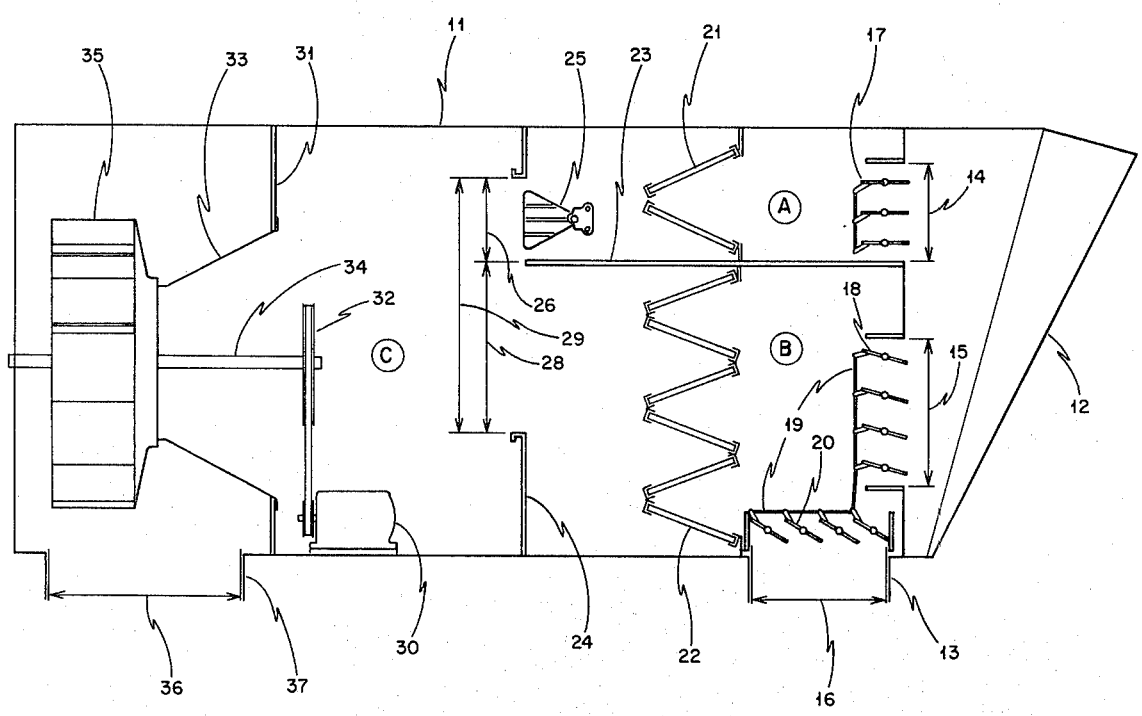

FIG. 2. A sectional view of the heater apparatus taken along the longitudinal axis of FIG. 1.

In the embodiment illustrated by the drawings, the housing 11 is generally of rectangular shape, having a downwardly directed weather hood 12 enclosing the first and second air admitting openings 14 and 15. The said air admitting openings 14 and 15 are served by the inlet dampers 17 and 18 respectively and communicate with the outside. Depending into the building is the return air duct 13 enclosing the third air admitting opening 16, which in turn is served by the inlet damper 20, and communicating with the building interior.

The incoming air flow through the said first air admitting opening 14 is separated from the mixed air flow through the said second and third air admitting openings by longitudinal partition 23.

The inlet damper 17, serving the first air admitting opening 14 is held in the open position whenever the burner 25 is ignited.

The inlet damper 18, serving the second air admitting opening 15, is mechanically linked by segmented linkage 19 to operate in opposition to the inlet damper 20 serving the third air admitting opening 16. The mechanical linkage is of conventional design and operates in such fashion that the opening of one inlet damper will automatically initiate the closure of the other in a complementary fashion; the linkage is driven by a suitable motor (not shown).

The filters 21 and 22 are of a conventional type and are provided to filter the air drawn through the flow path of the said air admitting opening 14 and the common flow path of the air admitting openings 15 and 16 respectively. The filters 21 and 22 are movably mounted in channel frames so that they may be readily installed, removed and serviced.

The chamber A is bounded by the housing 11, the longitudinal partition 23 and a segment of the vertical partition 24. The chamber A contains the flow path incoming from the first air admitting opening 14 and encloses the associated inlet damper 17, the filter 21 and the open flam type gas burner 25 contained within the minor profile opening 26.

The burner 25 is similar to that described and illustrated in the U.S. Pat. Nos. 3,051,464; 3,178,161 and 3,297,259.

This burner has a 25 to 1 ratio between its maximum and minimum rate of operation and is readily adjustable to assure a smooth and continuous variation of heat output. The turn down ratio of 25 to 1 will accommodate most all heating installations even in localities where extremely low outdoor temperatures prevail.

The chamber B, bounded by the housing 11, the longitudinal partition 23 and a segment of the vertical partition 24. The chamber B contains the flow path incoming from the said second and said third air admitting openings 15 and 16 and encloses the associated and mechanically linked inlet dampers 18 and 20, filter 22 and the major profile opening 28 of the vertical partition 24.

The downstream from Chambers A and B is the chamber C. The chamber C encloses the bulkhead 31 to which is mounted the fan impeller wheel 35 driven by a suitable electric motor 30 through the pulley 32. The fan impeller wheel 35 rotates on the longitudinal shaft 34 and is directed to exhaust air downwardly into the interior of the building through the outlet opening 36 enclosed within the outlet duct 37.

The area of the total profile opening 29 constitutes the total area of the air flow path from the said air admitting openings 14, 15 and 16 to the outlet opening 36.

The area of the minor profile opening 26 by which the said chamber A communicates with the said chamber C constitutes 20% of the total area of the air flow path. The area of the major profile opening 28 by which the said chamber B communicates with the said chamber C constitutes 80% of the total area of the air flow path. The volume of air flowing through the chamber A bears a ratio of one to four to the volume of air flowing through the chamber B.

At least two (2) temperature sensors and one pressure sensor are strategically located within the interior of the building. One temperature sensor regulates the flow of gaseous fuel to the burner, i.e., the quantity of fuel required to support the pre-selected temperature of the air supply. The other temperature sensor, in combination with the interior pressure sensor controls the linked inlet dampers 18 and 20 to proportion the appropriate flow of air through the said second and third air admitting openings 15 and 16 respectively.

In operation the impeller fan 35 is manually or automatically started and continued in operation by the motor 30 to deliver an air supply at outlet 36 at a fixed terminal velocity. The terminal velocity must be of sufficient magnitude to sustain a given pressure differential across the burner 25 to support complete fuel combustion. The outdoor air of given volume determined to sustain complete fuel combustion is drawn through the said first air admitting opening 15 and across the burner 25 in chamber A at a given profile velocity as dictated by the said pressure differential. By way of example, the parameters of burner operation by the manufacturer for the burner described and illustrated in the aforementioned patents is that a profile velocity be 3000 feet per minute (fpm) and that a negative pressure of $-0.56$ inches water column (w.c.) exist in chamber C for optimum operation of the burner 25.

Assuming the burner 25 has been ignited, a drop in the temperature of the air at outlet 36 below the pre-selected temperature will energize a control circuit (not shown) to admit more gaseous fuel to the burner 25 to increase the temperature.

The said negative pressure created in chamber C by the terminal velocity of the fan wheel draws outdoor air through the said first and second air admitting openings 14 and 15 and recirculated indoor air through the said third air admitting opening 16. The proportion of the outdoor air mixed with the indoor air in chamber B is controlled by the inlet dampers 18 and 20. The said inlet dampers 18 and 20 as aforesaid are connected to operate in opposition with one another and are under control of a thermostat stratigically located within the building interior (not shown). Consequently, the airstream drawn through chamber B and delivered into chamber C may consist entirely of unheated outdoor air or entirely of recirculated indoor air or a mix of the two dependent on the positioning of the said inlet dampers 18 and 20.

The heated outdoor air drawn through chamber A and the mix of unheated outdoor air and recirculated indoor air drawn through chamber B are combined in the chamber C and delivered at a fixed terminal velocity into the interior of the building through the output 36.

Once inside the building the air supply, by reason of a pressure differential, exerts equal pressure in all directions. To avoid heat stratification and assure uniform heat distribution to the floor level the temperature differential between the air delivered and the interior air is kept small. The temperature of the interior air is raised by progressively increasing the temperature of the delivered air with the constraint that the temperature differential be held to a minimum.

Upon reaching the walls of the building interior, the delivered air gives up its heat content and is exfiltrated through openings, cracks, etc. about doors and windows or selectively placed relief outlets. Because of the positive pressurization of the building interior, infiltration of outdoor air is reduced to a minimum.

At the instance of change in environmental conditions, that is, increased wind velocity; large change in outside temperature or climate; or mechanically generated pressures; a negative pressure can build up in the building interior as aforementioned. As the result, the said inlet dampers 18 and 20 may be positioned to permit an increase in the volume of unheated outdoor air in the delivered air. The increased volume of unheated air increases the positive pressure differential between the delivered air and the building interior air and acts to counteract the negative pressure.

After the negative pressure has been nullified, the temperature distribution is again relatively uniform throughout and the unheated outdoor air is reduced by the appropriate re-positioning at the inlet dampers 18 and 20. However, because the response follows directly on the change in interior building pressure the comfort recovery time is of short duration and hardly distinguishable.

The invention has been described with reference to specific structural characteristics of a housing and a partition structure together with a known type of burner. Changes and modifications may be made in all such elements along with alterations in the overall assembly. Various other modifications may be made without departing from the spirit and scope of the invention as set forth in the appended claims.

What is claimed is:

1. A space heating apparatus comprising
a housing,
a partition structure dividing the said housing into to plurality of chambers,
a first chamber provided with:
a first profile opening of given dimensions,
a first outdoor air admitting means located upstream of the said first profile means and
a burner means suspended within the said first profile opening,
a second chamber in juxtaposition with respect to said first chamber provided with:
a second profile opening of given dimensions adjacent to and in straight line abuttment but not in communication with the said first profile opening,
a second outdoor air admitting means and an indoor air admitting means located upstream of the said second profile opening,
a third chamber in communication with each of the said first and said second chamber by means of said first and said second profile opening means respectively and provided with:
a blower means downstream of said first and said second profile openings and an air discharge means located downstream of the said blower means,
the said indoor air admitting means and said air discharge means in communication with the space to be heated,
wherein the said first profile opening is in a one-to-four area airflow relationship with respect to the said second profile opening with the combined area airflow of both profile openings taken in combination with the capacity of the said blower means generating a given profile velocity over the said burner means suspended in said first profile opening; the indoor air and outdoor air mixture moved at the said profile velocity through the said second profile opening in variable complementary volume relationship as demanded by the need for pressurized make up air to sustain a given threshold static pressure in the space to be heated.

2. A space heating system comprising
a first chamber having,
a first profile opening at one end with a burner means suspended therein and a first outdoor air admitting means at the other,
a second chamber, not in communication with the said first chamber, having,
a second profile opening at one end,
a second air admitting means adjacent to an indoor air admitting means at the other; the said second air admitting means and the said indoor air admitting means served by a first and second damper means respectively to regulate the respective incoming air in a variable complemmentary volume relationship,
a common chamber in juxtaposition with respect to said first and said second chambers and in communication with each by means of the said first and second profile openings positioned in straight line abutting relationship having,
a blower means downstream of the said first and said second profile openings and an air discharge means downstream of the said blower,
wherein the said blower means pulls a constant volume of heated outdoor air, the product of complete fuel combustion, from the said first chamber and a constant volume of unheated outdoor air and unheated indoor air in variable complementary volume relationship from the said second chamber, and the said blower means mixes the plurality of air components into the space to be heated.

3. A space heating system including
a housing having,
a plurality of air inlets consisting of a first and second outdoor air outlets communicating with the ambient atmosphere and an indoor air inlet communicating with the space to be heated,
a first and second damper means to serve the said second outdoor air inlet and the said indoor air inlet operating in synchronized relationship to vary the inflow of outdoor and indoor air in variable complimentary proportions,
the said second outdoor air inlet and the said indoor air inlet partitioned not to communicate with the said first outdoor air inlet,
a discharge air outlet in communication with the space to be heated and in common communication with the said plurality of air inlets,
a first profile means situated and dimensioned to offer resistance to communication between the said first outdoor air inlet and the said discharge air outlet,
a burner means located within the said first profile means,
a second profile means situated and dimensioned to offer resistance to communications between the said second outdoor air inlet and the said indoor air inlet with the said discharge air outlet,
the said first and said second profile means being in straight-line abutting relationship,
a blower means downstream of the said first and said second profile means and located across the said discharge and outlet to pull air from the plurality of air inlets,
wherein the resistance to communication offered by the said first and said second profile means taken in combination with the capacity of the said blower means generates a profile velocity across the said burner means to support complete fuel combustion and the constant volume of the unheated outdoor air and unheated indoor air pulled through the second profile means is varied on demand in complementary volume relationship to modulate the constant volume of heated air pulled through said first profile means to sustain a given temperature and a given threshold starter pressure into the space in which the admixture is discharged.

4. A space heating apparatus in accordance with claim 1 wherein said burner means has a long burn down ratio in the range of 25 to 1 to sustain temperature rise increments of a few degrees, as well as, those approaching 120° F. or more.

5. A space heating apparatus in accordance with claim 1 wherein said blower means is a constant speed centrifugal backward curved fan.

6. A space heating apparatus in accordance with claim 1 wherein the said first and said second chambers contain baffle means moveably mounted and disposed to filter the outdoor and indoor air flowing in the said chambers.

7. A space heating system in accordance with claim 2 wherein the said blower means in conjunction with the modulated complementary volume relationship of outdoor and indoor air in the said second chamber seek to maintain a residual positive pressure of 0.1 inches water column in the space to be heated.

8. A space heating apparatus in accordance with claim 3 wherein 20% of the total air flow area defined by the said first profile opening and the second profile opening consists of outdoor air drawn across and heated by the said burner means and the balance of 80% being the volume of composite air flowing from the said air balancing means.

9. A space heating apparatus in accordance with claim 3 wherein the said burner means modulates the temperature rise in small increments of approximately 15° F. and the said air balance means in combination with the said blower means modulates the circulation of outdoor air through the said space heating apparatus means to prevent heat stratification and to accommodate the natural air infiltration and exfiltration characteristics of the space to be heated.

10. A space heating apparatus in accordance with claim 3 wherein the volume of outdoor air flow past and heated by the said burner means bears a minimum percentage by volume to the volume of composite outdoor and indoor air mixed and delivered into the space to be heated as determined by the ratio of the expected maximum temperature rise required by the surrounding ambient atmosphere and the reference maximum temperature rise prescribed by the design parameter of the said burner means.

11. A space heating apparatus in accordance with claim 1 wherein a constant volume of outdoor air drawn through the said first chamber and across the said burner is modulated by a constant volume of unheated outdoor air and unheated indoor air, drawn through said second chamber in variable complementary volume relationship in response to static pressure variation in the space to be heated, the outdoor air component increasing as the static pressure decreases.

* * * * *